United States Patent [19]
Renaud

[11] Patent Number: 4,682,764
[45] Date of Patent: Jul. 28, 1987

[54] CELERY PEELING HOLDER

[76] Inventor: Juan E. Renaud, 9170 Fountainbleau Blvd., Apt. 103, Miami, Fla. 33172

[21] Appl. No.: 844,945

[22] Filed: Mar. 27, 1986

[51] Int. Cl.$^4$ ............................................. B25B 1/00
[52] U.S. Cl. ....................................... 269/3; 269/131; 269/909
[58] Field of Search .................. 24/17 B, 482; 30/124, 30/298, 324, 327; 269/3, 130–132, 287, 289 R, 909

[56] References Cited

U.S. PATENT DOCUMENTS

| | | | |
|---|---|---|---|
| 1,242,610 | 10/1917 | Sindelar | 269/130 |
| 2,742,635 | 4/1956 | Capps | 269/131 |
| 4,029,277 | 6/1977 | Bulanda | 269/131 |

FOREIGN PATENT DOCUMENTS 1372865  8/1964  France ................................. 30/298

Primary Examiner—Robert C. Watson
Attorney, Agent, or Firm—Jesus Sanchelima

[57] ABSTRACT

A holder for celeries which are known to have a narrow and a wide end. The wide end is characterized by having concave inner walls. The holder has a cooperating convex headed termination that receives the concave portion of the celery and a handle portion over which the narrow end of the celery extends. Several rubber bands are used to maintain the celery securely in place with respect to the holder.

3 Claims, 5 Drawing Figures

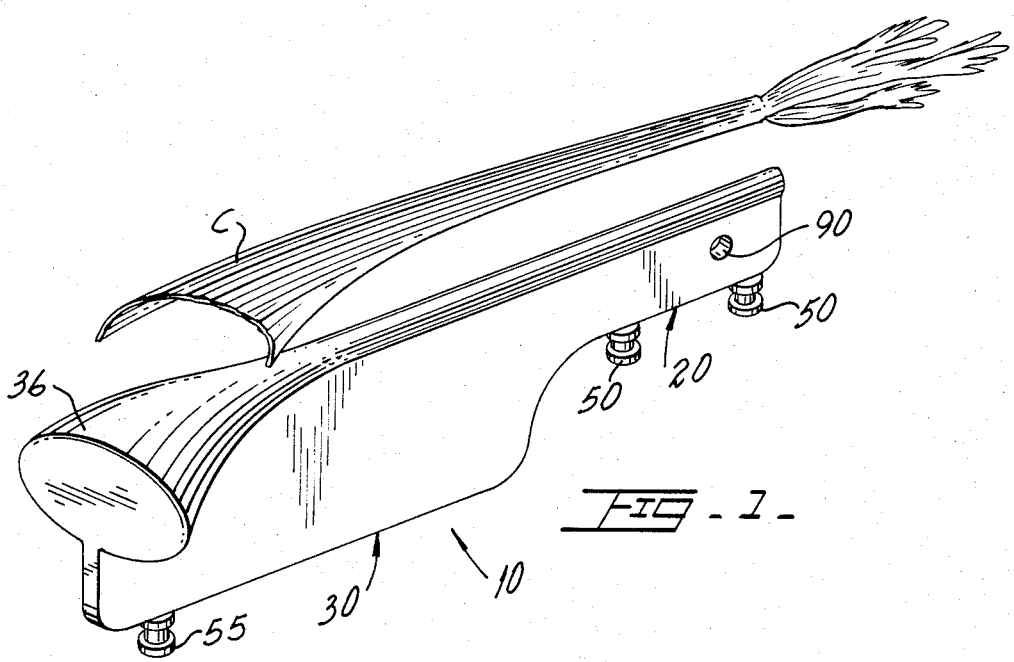
FIG. 1.
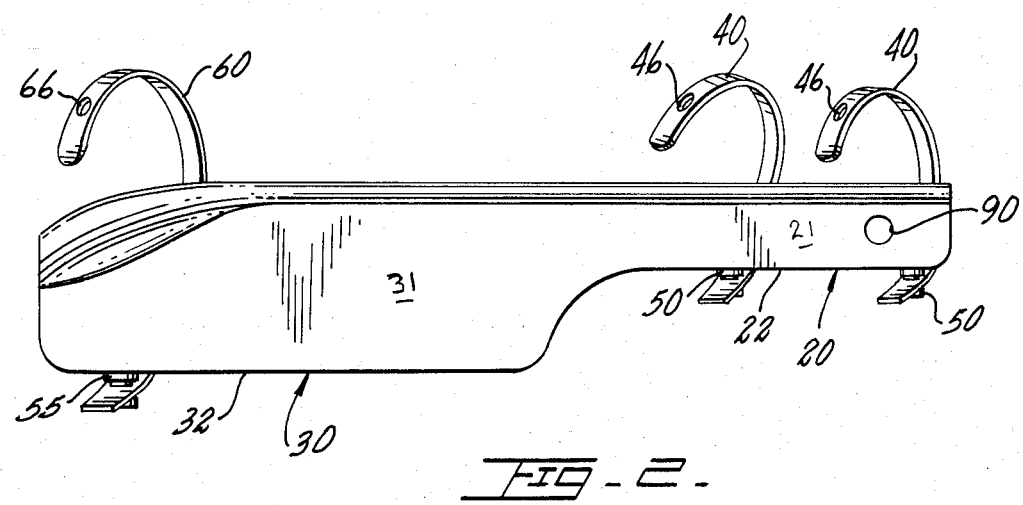
FIG. 2.
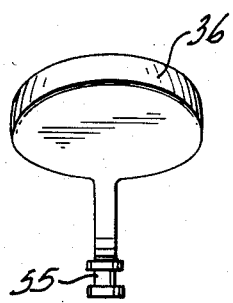
FIG. 3.
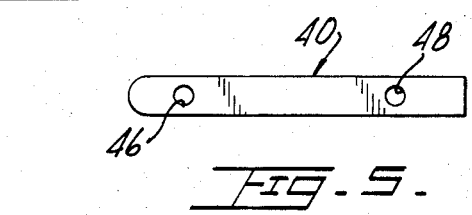
FIG. 5.
FIG. 4.

CELERY PEELING HOLDER

BACKGROUND OF THE INVENTION

1. Field of the Invention

The present invention relates to a celery peeling holder.

2. Description of the Related Art

It is well known that celeries have fibers that are annoying when eating it and it is desirable to peel them. However, celeries are slippery and difficult to hold unless one risks cutting his/her hand when peeling it or breaking the stem of the celery.

Applicant believes that the closest reference corresponds to U.S. Pat. No. 2,766,794, issued to E. D. Odale. However, it differs from the present invention because it holds the vegetable with pins 13 which would not work for celeries since they have an elongated shape with concave inner walls on the wider end and narrow down towards the opposite end.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a holder for celeries that facilitates its peeling.

It is still another object of this invention to provide a holder that is simple to use in restaurants and homes.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawing in which:

FIG. 1 represents a view in perspective of the celery peeling holder.

FIG. 2 a side view of the celery peeling holder.

FIG. 3 illustrates a front view of the celery peeling holder.

FIG. 4 is a representative of one of the rubber bands.

FIG. 5 shows one of the two smaller rubber bands.

DETAILED DESCRIPTION OF THE PREFERRED EMBODIMENT

Referring now to the drawings, where the present invention is generally referred to with numeral 10, it can be observed that it includes a handle portion 20 of relatively smaller width than celery support portion 30. Handle portion 20 and support portion 30 are integrally built but they may also be separate and independent members that would be attached to each other in a variety of ways. Support portion 30 includes a convex headed termination 36 that follows the contour of the concave inner walls of the average celery on its wider end. Convex headed termination 36 is positioned a certain distance above underside 32 so that a user may lean on underside 32, if desired, when peeling celery C and celery C is still separated from the surface used for support. Preferably, handle portion 20 and support portion 30 are flat so that celery C may be secured to sides 21 and 31 with the concave portion of celery C pointing upwardly. This way, a user may peel the edges of celery C, if desired.

Rubber bands 40 include holes 46 on one end and hole 48 on the other end. A post 50 is rigidly mounted to the underside 22 of handle portion 20. One of the holes, 46 or 48, is aligned with the exposed lower end of post 50 so that the latter penetrates through. The other end of rubber band 40 is placed over the celery C being peeled thereby holding it securely in place by being placed over or embracing the celery's narrow end. The tension of rubber band 40 keeps celery C in place with respect to holder 10.

Another longer rubber band 60 with holes 66 and 68 is similarly used to hold the wider end of the celery C being peeled in cooperation with post 55 mounted to the underside 32 of support portion member 30. Posts 50 and 55 preferably include a headed termination that prevents rubber bands 40 and 60 from accidentally slipping out. After peeling, the ends of celery C are cut off and only the section in the middle is eaten. The reason for two rubber bands 40 on the handle portion 20 is because there are celeries with short and long stems.

An opening 90 is located, preferably, on the outer end of handle portion 20 so that holder 10 may be hung from a conventionally protruding pin member or nail as it customarily done with kitchen utensils.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A holder for celery having a wide and a narrow end, comprising:
   A. an elongated handle member that includes an underside and including first post means mounted to said underside and, further including first rubber band means including a hole substantially on each end and so arranged and constructed to be removably mounted to said first post means and placed around the narrow end of said celery; and
   B. an elongated support member for said celery integrally built on one end of said handle member and having a convex headed termination on the end of said support member opposite to said handle member and said headed termination having a shape that substantially follows the concave contour of the inner walls of said celery on its wide end.

2. The holder set forth in claim 1 wherein said support member includes an underside and including second post means mounted to said support member underside, and further including second rubber band means including a hole substantially towards each end of said second rubber band means and so arranged and constructed to be removably mounted to said second post means and placed around the wider end of said celery.

3. The holder set forth in claim 2 wherein said support member underside extends downwardly a sufficient distance so that said convex termination is separated from said underside thereby facilitating the use of said support member underside to provide support to a user during the peeling operation.

* * * * *